United States Patent [19]

Shotey

[11] Patent Number: 4,988,832
[45] Date of Patent: Jan. 29, 1991

[54] RECESSED ELECTRICAL OUTLET WITH COVER

[76] Inventor: Michael J. Shotey, 7733 East Cypress, Scottsdale, Ariz. 85257

[21] Appl. No.: 265,262

[22] Filed: Oct. 31, 1988

Related U.S. Application Data

[63] Continuation-in-part of Ser. No. 66,993, Jun. 29, 1987, Pat. No. 4,803,307.

[51] Int. Cl.⁵ .............................................. H02G 3/14
[52] U.S. Cl. ......................................... 174/67; 174/53
[58] Field of Search ................. 174/53, 58, 67; 220/3, 220/5, 242

[56] References Cited

U.S. PATENT DOCUMENTS

| | | | |
|---|---|---|---|
| 2,510,745 | 6/1950 | Kilgore | 174/67 |
| 2,757,817 | 8/1956 | Egan | 220/3.5 |
| 3,701,451 | 10/1972 | Schindler et al. | 174/58 X |
| 4,505,403 | 3/1985 | Bowden, Jr. et al. | 174/67 X |

FOREIGN PATENT DOCUMENTS 644330  7/1962  Canada ................................. 174/53

Primary Examiner—Gerald P. Tolin
Assistant Examiner—David A. Tone
Attorney, Agent, or Firm—Cahill, Sutton & Thomas

[57] ABSTRACT

A wall mounted recessed electrical outlet, installable in new or old construction, includes a housing having recessed female outlets mounted therein for receiving and containing male plugs plugged therein. A pivotally or removably attached lockable cover, flush with the adjacent wall surface, seals the opening to the housing against intrusion of foreign matter while accommodating externally extending cords from the plugged in male plugs.

17 Claims, 4 Drawing Sheets

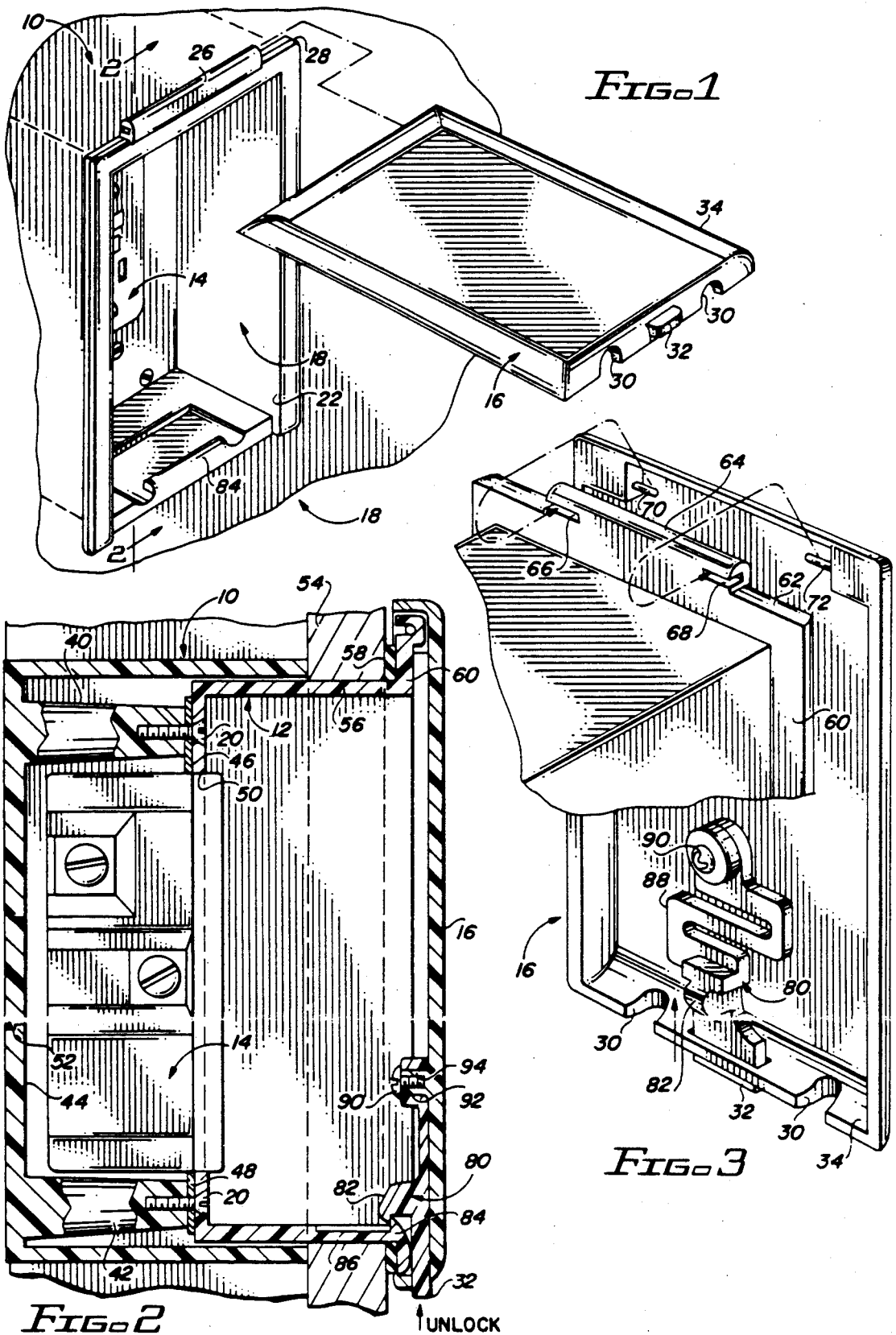

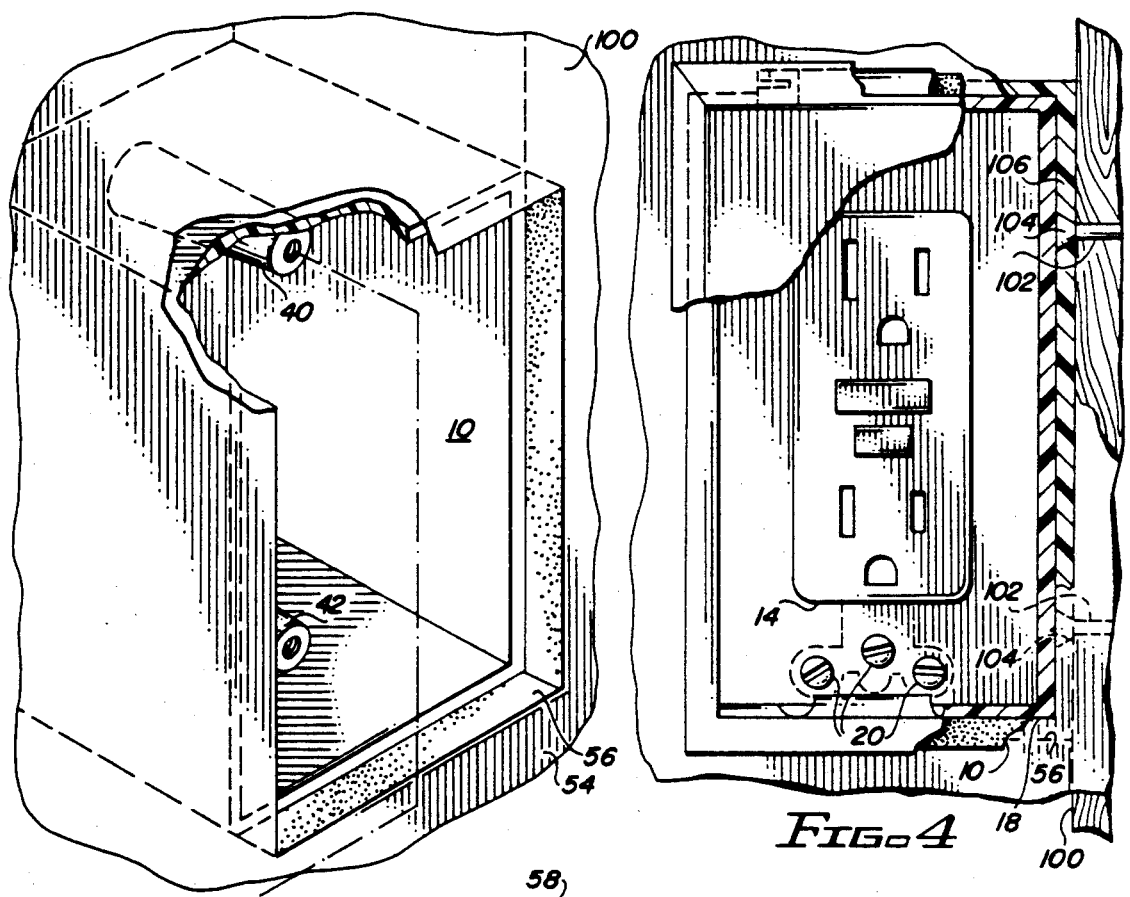
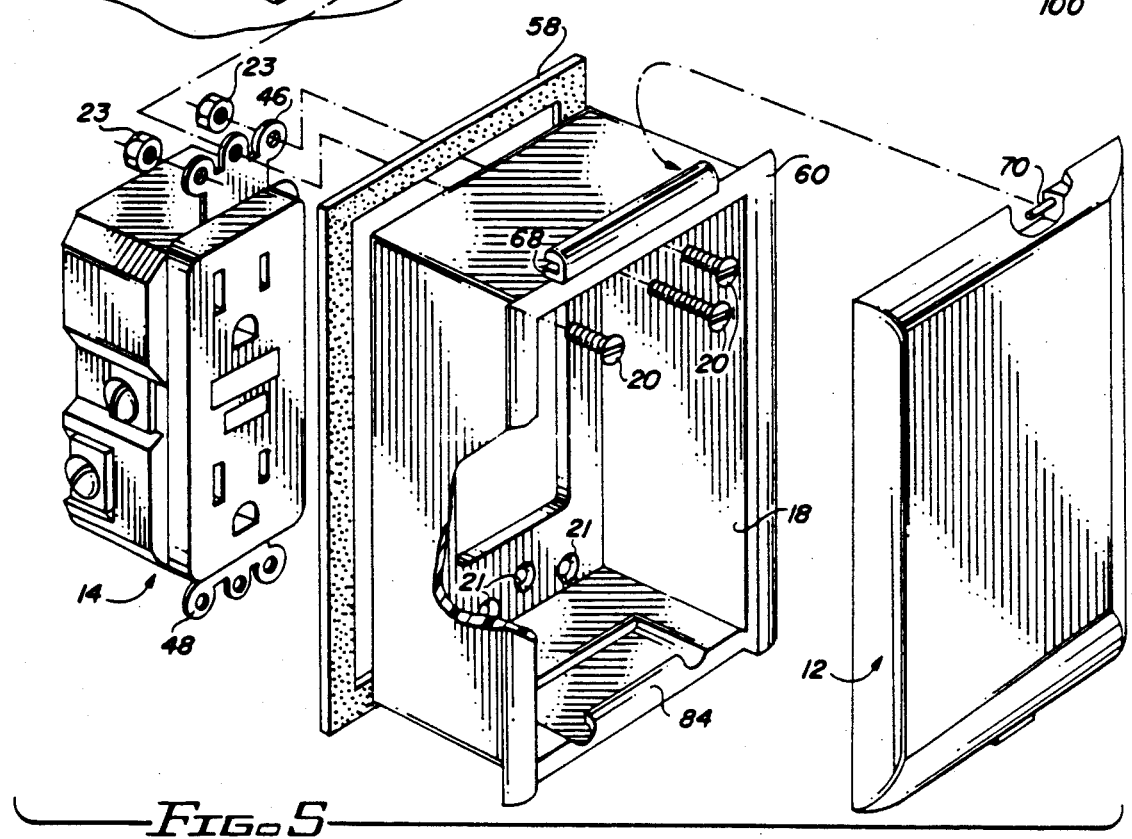

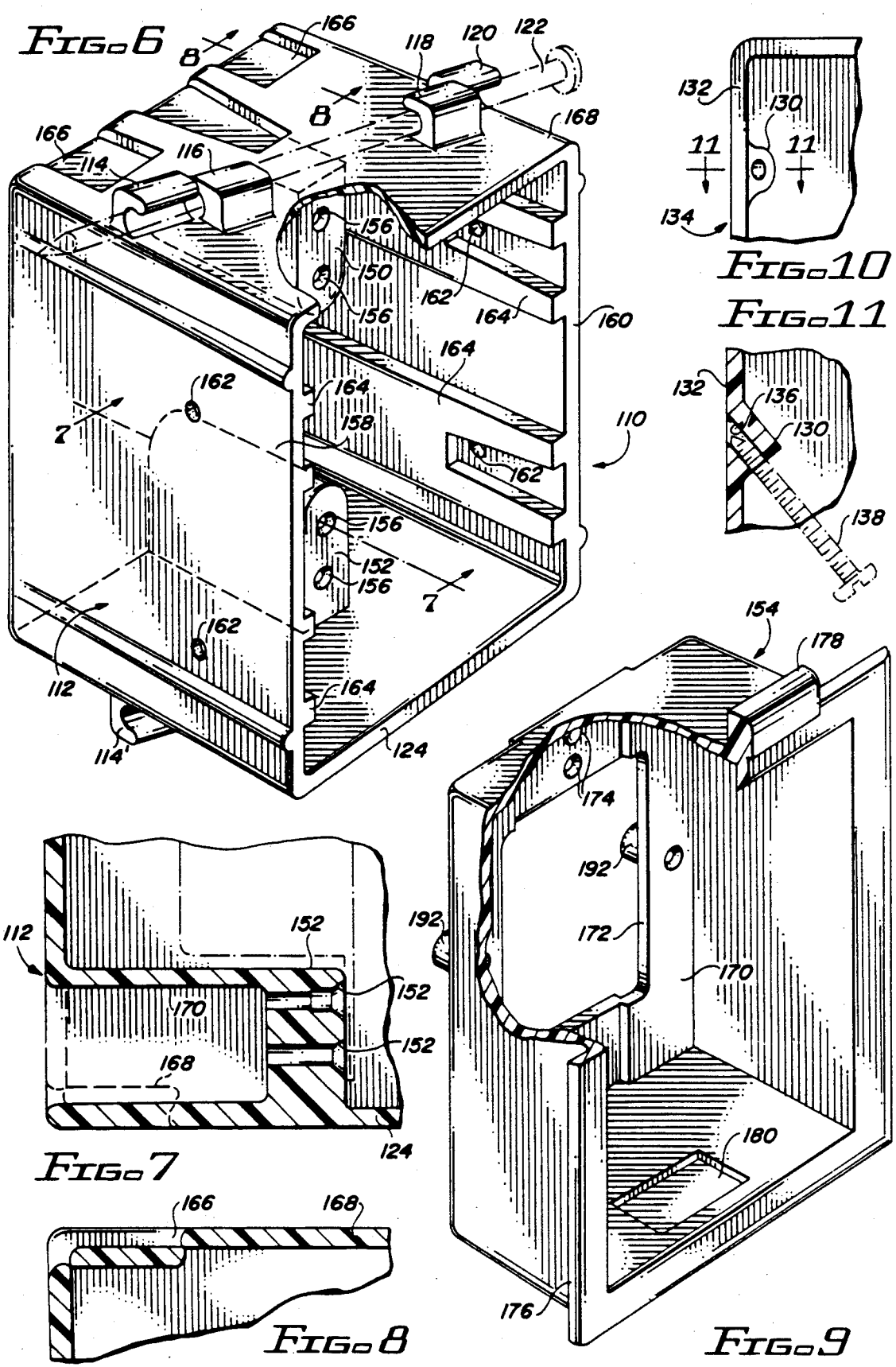

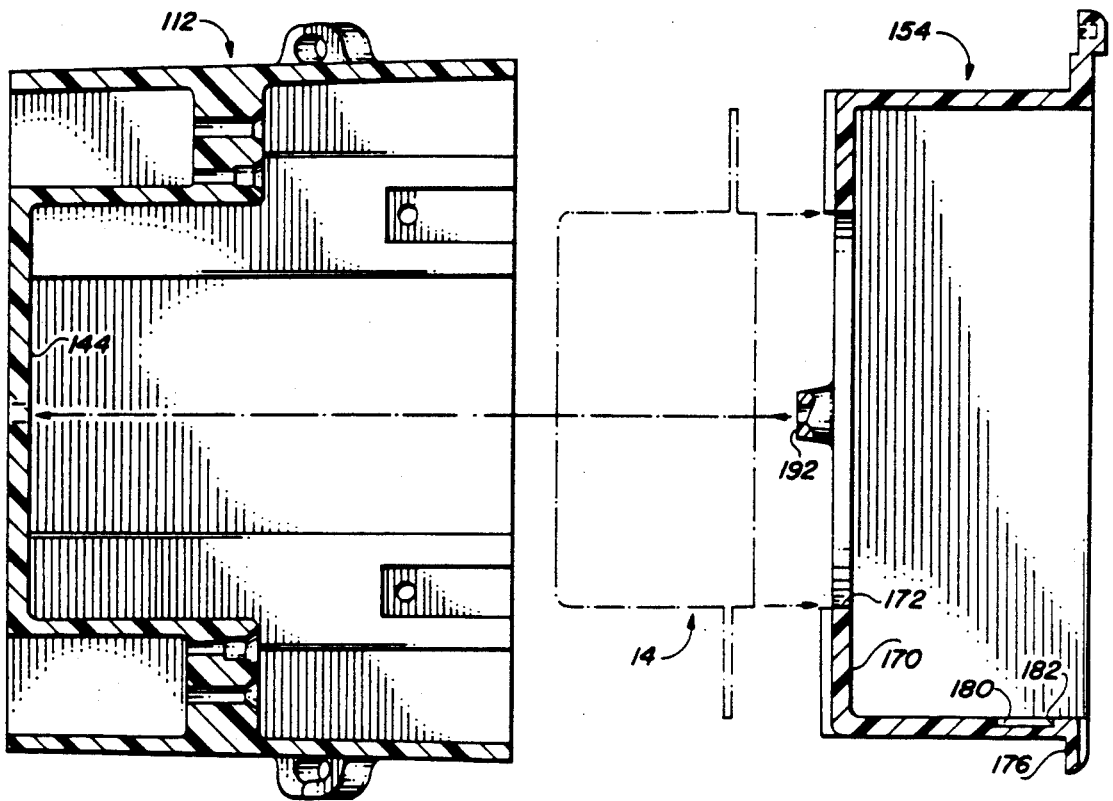
FIG. 12
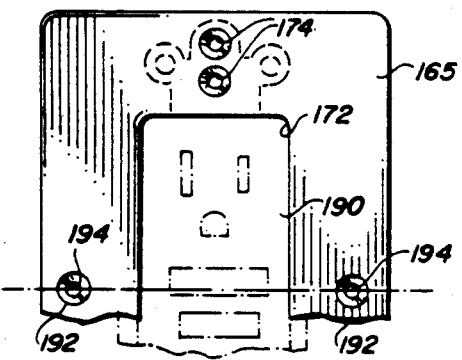
FIG. 13  FIG. 14
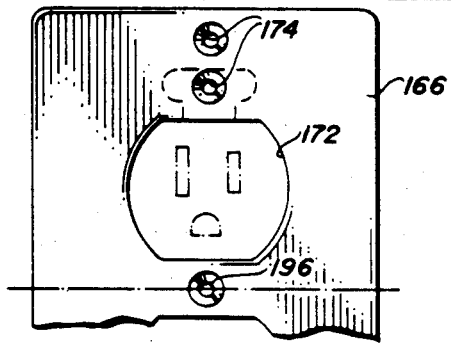
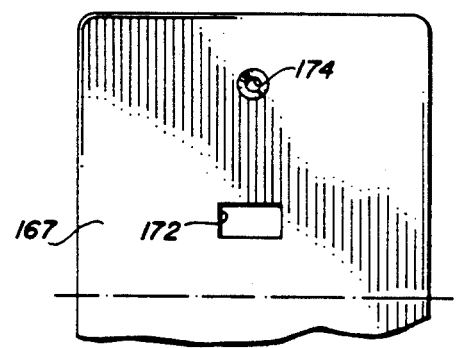
FIG. 15
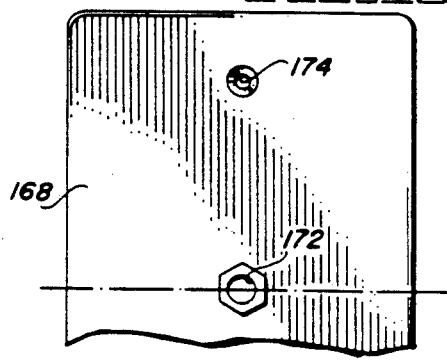
FIG. 16

RECESSED ELECTRICAL OUTLET WITH COVER

CROSS REFERENCE TO RELATED APPLICATION

The present application is a continuation in part application of a copending application entitled "WEATHERPROOF OUTLET COVER", Ser. No. 066,993, filed June 29, 1987, U.S. Pat. No. 4,803,307 and it is related to a copending application entitled "TIMER ASSEMBLY WITH WEATHERPROOF HOUSING", Ser. No. 068,349, filed July 1, 1987, both describing inventions of the present inventor.

BACKGROUND OF THE INVENTION

1. Field of the Invention

The invention relates to electrical outlets and, more particularly, to covers for recessed electrical outlets.

2. Description of the Prior Art

Electrical outlets for both home and commercial use are often located outdoors to provide electrical power to electrically operated appliances, tools and other devices regularly or intermittently used outdoors. Unless these outlets are protected by an awning, overhang or other weather protecting element, there exists a substantial possibility that an electrical hazard will be created under certain weather conditions or other activities in proximity to the electrical outlet. Moreover, such electrical outlets, whether indoor or outdoor, are subject to the presence of various liquid and solid contaminants which may affect operability or compromise safety. Accordingly, various covers have been devised for covering or sealing an electrical outlet during non-use.

Electrical outlets, whether for use indoors or outdoors, are generally mounted flush with an adjacent wall surface. Such mounting necessitates that electrical plugs plugged thereinto extend outwardly from the surrounding wall surface. These plugs may be partially dislodged as a result of inadvertent contact by persons or objects. A partial dislodgement generally exposes the prongs of the electrical plug, which exposure creates an electrical hazard. Indoor use of electrical plugs with conventional outlets poses a safety hazard for young children who may play with such plugs or the cords extending therefrom. In an outdoor environment, exposed plugs plugged into a conventional electrical outlet may create an electrical hazard as a result of rain or particulate matter in contact with an exposed electrical plug. A cover for enclosing electrical plugs plugged into an electrical outlet is disclosed in the above identified parent application, Ser. No. 066,993, now U.S. Pat. No. 4,803,307. Such a cover provides adequate shielding of an electrical outlet and any electrical plug plugged thereinto. The cover extends from the wall surface supporting the electrical outlet and may be bumped or otherwise inadvertently damaged. Such a cover may not be aesthetically appealing in certain environments.

SUMMARY OF THE PRESENT INVENTION

A recessed outlet includes female plugs recessed within a enclosure to a degree sufficient to accommodate a mating male plug and a segment of the cord extending therefrom without intruding past the plane of the wall surface within which the recessed outlet is mounted. A cover, flush with the wall surface, seals the opening to the recessed outlet while accommodating egress of the electrical cords associated with any plugged-in male plugs. The cover may be removably pivotally or otherwise secured to the recessed outlet. To prevent intrusion of water, other fluids and particulate contaminants within the recessed outlet, the junction between the recessed outlet and the cover may be sealed with a gasket or otherwise configured to prevent intrusion of liquids and particulate material.

To retain the cover in place, a lock of resilient non-conductive material may extend from the cover to lockingly engage the recessed outlet. Preferably, the lock has a depth insufficient to interfere with the recessed plugs or the cords extending externally intermediate the recessed outlet and the cover.

It is therefore a primary object of the present invention to provide a wall mounted recessed electrical outlet with a cover for housing mating electrical plugs interior of the plane of a wall surface.

Another object of the present invention is to provide a wall mounted electrical outlet having a cover flush with the wall for covering mated electrical plugs.

Yet another object of the present invention is to provide a weatherproof recessed outlet having a cover flush with the adjacent wall surface for protecting plugs plugged into the outlet.

Still another object of the present invention is to provide a recessed electrical outlet having means for securing it to a stud or cross member of a conventional new or existing frame wall.

A further object of the present invention is to provide an outlet housing a pivotally attached cover for protecting plugs and accommodating externalization of associated cords while retaining the cover flush with an adjacent wall surface.

A yet further object of the present invention is to provide a cover having a lock for maintaining it flush with a adjacent wall while protecting electrical plugs plugged into an associated electrical outlet.

A still further object of the present invention is to provide a weatherproof electrical outlet having a cover mounted flush with an adjacent wall for protecting plugged in electrical plugs and accommodating cords extending therefrom.

These and other objects of the present invention will become apparent to those skilled in the art as the description thereof proceeds.

BRIEF DESCRIPTION OF THE DRAWINGS

The present invention will be described with greater specificity and clarity with reference to the following figures, in which:

FIG. 1 is an isometric view of an electrical outlet and an associated cover;

FIG. 2 is a cross sectional view taken along line 2—2, as shown in FIG. 1;

FIG. 3 illustrates a rear view of the removable lockable cover;

FIG. 4 is a front elevational view of a recessed electrical outlet;

FIG. 5 is an exploded isometric view of the major components of the recessed electrical outlet;

FIG. 6 illustrates apparatus for securing the recessed electrical outlet to a stud;

FIG. 7 is a cross sectional view taken along line 7—7 as shown in FIG. 6;

FIG. 8 is a cross sectional view taken along line 8—8, as shown in FIG. 6;

FIG. 9 is a partial cutaway perspective view of a bracket to be fitted within the housing of the outlet;

FIG. 10 is a partial frontal view illustrating a variant for attaching the housing to a stud;

FIG. 11 is a partial cross sectional view taken along line 11—11, as shown in FIG. 10;

FIG. 12 is a cross sectional view of components of the electrical outlet; and

FIGS. 13 to 15 illustrate alternate plates mountable within the recessed electrical outlet.

DESCRIPTION OF THE PREFERRED EMBODIMENT

Referring to FIG. 1, there is shown a housing 10 having a bracket 12 associated with an electrical socket or outlet 14 and a cover 16 for shielding the interior of the housing. This combination will be referred to as recessed electrical outlet 18. The outlet includes one or more conventional female outlets, with or without ground fault indicators. The outlet is recessed sufficiently from opening 22 of the housing to accommodate enclosure therein of a conventional male electrical plug. Cover 16 may be pivotally attached to upper edge 26 of housing 10, as illustrated. Alternatively, the cover may be pivotally, or otherwise, secured or retained by one of the remaining sides or even a corner of the housing. To assist cover 16 in providing weather proof protection for outlet 14 and any plugs mated therewith, a gasket 28 or similar device for sealing the cover with opening 22 of the housing may be used. The cover may also include a plurality of recesses 30 to accommodate externalization of the cords attendant any male electrical plugs engaged with outlet 14. A button 32, cooperating with a lock mechanism, lockingly engages the cover with the housing. The cover may wrap around opening 22 of the housing, as suggested by curved frame 34 circumscribing the cover.

Referring jointly to FIGS. 2 and 3, further details attendant the embodiment illustrated in FIG. 1 will be described. Housing 10, as illustrated in FIG. 2, is of a configuration particularly suitable for use with new construction. It is attached to a stud or like member, as described and illustrated in further detail with regard to FIG. 6. The housing includes a pair of stanchions 40, 42, or like elements, extending from base 44. These stanchions support bracket 12 through machine screws 20, or the like. Additionally, flanges 46, 48 extending in opposed directions from outlet 14 serve as mountings for the outlet and may be secured intermediate stanchions 40, 42, respectively, and end wall 50 of bracket 12. An aperture 52 may be formed in base 44 of housing 10 for penetrably receiving electrical conductors secured to the outlet.

At the time of construction of a wall within which recessed electrical outlet 18 is to be mounted, housing 10 may be secured to a stud or like anchor. After wallboard 54 is attached to the studs, a cutout 56 in the wallboard is made commensurate with the location of housing 10 and sized to penetrably receive bracket 12. Prior to insertion of the bracket, a gasket 58 or other sealing element may be disposed about the mounting to bear against the adjacent surface of the wallboard to form a seal between the bracket and the surrounding wallboard. The bracket may include an circumscribing flange 60 to bear against gasket 58 as well as to provide rigidity to the structure attendant opening 22. Upper edge 62 of flange 60 may include an extension 64 having a pair of opposed rearwardly opening slots 66, 68 formed in the ends thereof. Cover 16 includes a pair of inwardly facing opposed pins 70, 72 configured to be inserted within slots 66, 68, respectively, to permit and accommodate rotation of the cover about the common longitudinal axis of the pins. Accordingly, cover 16 may be pivotally engaged with bracket 12. While a particular pivotal arrangement has been described and illustrated for the cover, it is to be understood that the cover could be pivotally secured to any other edge or corner of the bracket or other part of the recessed electrical outlet. Furthermore, various embodiments providing pivotal interconnection could be employed. Furthermore, a combination of lip and receiving recess or such other interlocking or engaging mechanisms could be adapted to secure the cover.

To accommodate the cords of any electrical plugs mounted within the recessed electrical outlet, recesses 30 may be developed in cover 16. These recesses may be sufficient to accommodate the thickness of one or more cords. Alternatively, these recesses may cooperate with corresponding recesses in bracket 12. Moreover, accommodation for externalization of the cords could be provided solely by the bracket and without any accommodating assistance from the cover.

To retain the cover in place, a lock mechanism 80 having a push button 32 extending externally of the cover may be employed as shown in FIGS. 2 and 3. The lock mechanism includes a latch 82 for engaging a lip 84 extending upwardly from bottom wall 86 of bracket 12. A serpentine like segment 88 of resilient material, such as a manmade plastic, provides a downward bias to latch 82 to urge the latch into engagement with lip 84. The resilient characteristic of element 88 permits upward pushing upon button 32 to release the latch from lip 84 and thereafter permit opening of the cover. Element 88 may be secured to cover 16 by means of a screw 90 engaging a boss 92. Element 88 includes an aperture 94 for receiving the boss. As noted in FIG. 2, frame 34 of the cover extends about flange 60 to establish an enclosing relationship therewith to prevent ingress of water, particulate matter and other foreign matter into the recessed electrical outlet; gasket means may also be incorporated to seal the cover with the bracket.

Referring to FIGS. 4 and 5, there is shown in further detail outlet 14 and its relationship with bracket 12 and housing 10. Prior to mounting of either outlet 14 or bracket 12, housing 10 may be secured to a wall stud 100 by fastening means, such as nails or screws 102 extending through apertures 104 in side wall 106 of housing 10. After attachment of the housing, electrical conductors are brought into the housing for electrical connection with outlet 14 in a conventional manner. The outlet is secured to stanchions 40, 42 with machine screws 20 or the like penetrating apertures 21 in bracket 12. Alternately, the two outboard machine screws illustrated may be secured with nuts 23. Prior to insertion of bracket 12 through cutout 56 in the wallboard and into housing 10, gasket 58 is mounted thereon generally adjacent flange 60 to bear against the cutout surrounding surface of wallboard 54. Upon attachment of cover 12 through engagement of pins 70, 72 with slots 66, 68, the recessed electrical outlet is ready for use.

Referring to FIG. 6, there is illustrated a variant 110, or alternative embodiment, of housing 10. This variant is particularly adapted for installation in new construction of a wallboard covered stud construction wall. Housing 112 includes a plurality of guides 114, 116, 118 and 120 for receiving and angularly orienting a nail 122 to be used to secure the housing to an adjacent stud. It will be noted that the angular orientation of the nail permits hammering of the nail from a location close to the direct front of the housing. Clearly, the angle at which the nail is oriented may vary depending upon various considerations of ease and structural robustness. Similar guides for a nail may be mounted on the outside surface of bottom 124 of the housing, as representatively depicted by guide 114'. With the configuration illustrated, it may be noted that in the orientation shown, variant 110 would be attached to a stud disposed on the left side. However, if the variant were turned upside down, it could be attached to a stud located on the right hand side. This capability for attachment to either the left or right side of a stud will provide a substantial freedom in mounting and avoid the necessity for one variant for left side attachment and a mirror image variant for right side attachment.

Variant 110 may also be used with a preexisting wallboard covered frame wall provided sufficient wallboard is removed to provide access to hammering nails 122. Under certain circumstances, there may be difficulty in moving sufficient wallboard to permit attachment of exteriorly secured nails, as depicted in FIG. 6. In such situations, a housing having the nail receiving and guide elements illustrated in FIGS. 10 and 11 may be employed. A boss 130 extends internally of sidewall 132 of a housing 134. The boss includes a passageway 136 set at an angle to permit driving of a nail 138 through the front opening of the housing. It is to be understood that a plurality of such bosses or nail holders may be formed on each side of housing 134 in a number sufficient to provide the requisite structurally rigid attachment.

As jointly depicted in FIGS. 6, 7 and 8, housing 112 may include a pair of opposed integrally formed supports 150, 152 for receiving and supporting an outlet and an internally mounted bracket 154, as depicted in FIG. 9. These supports include threaded cavities 156 for receiving fastening means, such as machine screws. In addition, the supports are sufficiently robust to provide the requisite structural rigidity for the outlet and the bracket to withstand normally expected wear, handling and abuse. Sidewalls 158, 160 may include apertures 162 disposed therein for penetrably receiving screws or other fastening means to secure housing 112 to a stud. Such attachment could be used in new construction or for securing housing 112 to a stud of an existing wall where removal of wallboard only the size of housing 112 is preferred. The sidewalls may also include a plurality of ribs, designated by numeral 164, for structural robustness. Knockouts 166 disposed in top wall 168 of housing 112 may be incorporated to provide a passageway for electrical conductors to be connected with a outlet to be mounted within the housing. Similar knockouts 168 (See FIG. 7) may be disposed in bottom 124 of the housing. A cavity 170 may be formed within each of supports 150, 152 for manufacturing reasons and to save material.

Bracket 154 includes a base 170 having an aperture 172 configured in conformance with the planform of that portion of outlet 14 to be penetrably inserted therewithin. The base may also include a plurality of apertures 174 positioned and sized to conform with apertures 156 of supports 150 and 152 to permit attachment of the bracket thereto. As particularly noted in FIGS. 9 and 12, bracket 154 includes an encircling flange 176 having an extension 178 for engaging a cover, as discussed above, with regard to FIGS. 1, 2 and 3. A depression 180 has a sidewall 182 for engaging the latch of a lock that might be used with a cover for the bracket.

Because may be used with a plurality of outlets, such as a standard dual female plug outlet, a ground fault indicator outlet, a single female electrical plug, a telephone jack or a television jack, various configurations of base 170 may be developed. These configurations are representatively shown in FIGS. 14 to 17. Alternatively, FIGS. 14 to 17 represent interchangeable plates attachable to base 170 to accommodate different female plugs. A ground fault indicator electrical outlet 190 is illustrated in FIG. 14. Plate 165 has aperture 172 configured as a commensurately sized rectangle. Plate 166, illustrated in FIG. 15, includes a pair of apertures (of which only aperture 172 is illustrated) configured to receive one part of a two female plug outlet. The second aperture is a duplicate thereof. Plate !67, shown in FIG. 16, includes a rectangular aperture 172 configured to mate with a telephone jack that might be mounted within the associated housing. Plate 168, shown in FIG. 17, includes an aperture 172 configured to penetrably receive a jack for an attached television antenna. Each of the plates shown in FIGS. 14 to 17 may include one or more mounting apertures 174. In addition, as shown jointly in FIGS. 12 and 14, bosses 192 may depend from base 170 to define further laterally disposed apertures 194. These bosses may be used to support machine screws for attaching one of plates 165 to 168. Alternatively, machine screws may extend rearwardly for threaded engagement with rear wall 144 of housing 112, as depicted in FIG. 12. The configuration of plate 166 or base 170, as depicted in FIG. 15, may include a centrally located aperture for penetrably receiving a machine screw that engages a threaded aperture in outlet 14.

From the above description of the various embodiments of the recessed electrical outlet, it will become apparent that it may be used in conjunction with new construction or in conjunction with existing construction. Furthermore, it may be used in conjunction with cinder block walls using conventional and presently used techniques. Upon installation, the recessed electrical outlet has a front face essentially flush with the supporting wall, whether or not male electrical plugs are plugged in. The cover used therewith protects the interior of the housing from the elements and against contamination by foreign matter whether or not male electrical plugs have been plugged in. The cords associated with any plugged-in male plugs may be externalized via recesses formed in the cover, as illustrated. Alternatively, such recesses may be formed in the bracket or the housing; a partial recess may be formed in each of the housing and the cover to accommodate externalizing the cords. The cover may be latched with a simple spring biased latch that is of a thickness essentially commensurate with the thickness of the cover to prevent the latch from intruding into the space for the plugs or from interfering with any cords extending from the plugs. Although the cover is illustrated as being pivotally depending from the top edge of the recessed electrical outlet, the point of attachment can be at any other location on the outlet. Moreover, cover may be pivotally attached or secured by any of various means to protect the inside of the recessed electrical outlet from the elements and foreign matter while also providing access to the interior for purposes of inserting or removing electrical plugs or other plugs.

While the principles of the invention have now been made clear in an illustrative embodiment, there will be immediately obvious to those skilled in the art many modifications of structure, arrangement, proportions, elements, materials and component used in the practice of the invention which are particularly adapted for specific environments and operating requirement without departing from those principles.

I claim:

1. A wall mounted weather proof electrical outlet mountable essentially flush with the wall surface for receiving at least one electrical male plug having an electrical cord extending therefrom, which male plug is to be plugged into an electrical socket mountable in said electrical outlet, said outlet comprising in combination:
   (a) a housing;
   (b) means for securing said housing within the wall;
   (c) a bracket for defining an opening to said housing, said bracket including means for sealing the junction between said bracket and the wall;
   (d) means for interconnecting said housing with said bracket to mount the electrical socket and to locate the electrical socket a sufficient distance from the opening to accommodate the plugged in male plug between the electrical socket and the opening;
   (e) means for covering the opening to enclose the plugged in male plug, said covering means being essentially flush with the adjacent wall surface;
   (f) means for attaching said covering means with said bracket, including means for locking said covering means with said bracket, said locking means including a latch extending from side cover for engaging said bracket, bias means for biasing said latch against said bracket and a push button for releasing said latch from said bracket; and
   (g) means for accommodating passage of the electrical cord extending from the plugged in male plug to a remote location.

2. The outlet as set forth in claim 1 wherein said covering means includes a curved peripheral frame defining the thickness of said covering means and wherein aid biasing means is disposed within the confines of the thickness of said covering means.

3. The outlet as set forth in claim 1 wherein said biasing means is a serpentine shaped ribbon.

4. A coverable recessed electrical outlet mountable within a wall for enclosing flush with the adjacent wall surface at least one male electrical plug to be plugged into an electrical socket mountable within said recessed electrical outlet, said recessed electrical outlet comprising in combination:
   (a) means for attaching said recessed electrical outlet to the wall;
   (b) a bracket for defining an opening to he electrical socket mountable within said recessed electrical outlet, which opening is essentially flush with the surface of the wall;
   (c) said bracket including means for interconnecting the electrical socket with said bracket to locate the electrical socket recessed from the opening a sufficient distance to accommodate enclosure within said bracket of the male plug plugged into the electrical socket;
   (d) means for selectively covering the opening, said covering means being essentially flush with the wall surface adjacent said recessed electrical outlet without interfering with any plugged in male plug;
   (e) means for locking said covering means with said bracket, said locking means including a latch for engaging said bracket, bias means for biasing said latch against said bracket and a push button for releasing said latch from said bracket; and
   (f) means for accommodating externalization of any cords associated with a plugged in male plug.

5. The outlet as set forth in claim 4 wherein said interconnecting means includes a plate for receiving the electrical socket.

6. The outlet as set forth in claim 4 wherein said attaching means includes means for fastening said recessed electrical outlet tot he wall and guide means for receiving said fastening means.

7. The outlet as set forth in claim 4 wherein said covering is pivotally attached to said bracket.

8. The outlet as set forth in claim 4 wherein said interconnecting means includes means for interconnecting more than one of the electrical outlets and wherein said interconnecting means accommodates enclosure within said bracket of any male plugs plugged into any of the electrical outlets.

9. A covered apparatus for receiving a removable mating plug matable with an electrical socket mountable within said apparatus, said apparatus comprising in combination:
   (a) means for mounting the electrical socket within a wall member, said mounting means including an opening for receiving the mating plug and a segment of a cord extending form the mating plug;
   (b) means for locating said mounting means to position the opening essentially flush with the surface of the wall member;
   (c) means for accommodating positioning of the mating plug between the electrical socket and the opening; and
   (d) a cover for selectively closing the opening, said cover being located in the closed position essentially flush with the surface of the wall member, said cover including means for accommodating externalization of the cord attendant the mating plug; and
   (e) means for locking said cover with said mounting, said locking means including a latch for engaging said mounting, bias means for biasing said latch against said mounting and a push button for releasing said latch from said mounting.

10. The apparatus as set forth in claim 9 wherein said mounting means comprises a plate for receiving the electrical socket.

11. The apparatus as set forth in claim 9 wherein said mounting means includes a bracket for defining the opening, a flange extending from said bracket about the opening and juxtaposed with the surface of the wall.

12. The apparatus as set forth in claim 11 wherein said flange includes means for supporting said cover.

13. The apparatus as set forth in claim 7 wherein said mounting means includes a housing defining a rectangular cavity having a rear wall and an open end and a bracket, said bracket defining a rectangular cavity having a base nestable within a part of said housing.

14. The apparatus as set forth in claim 13 wherein said locating means includes means for positionally fixing said bracket with respect to said housing.

15. A wall mounted weather proof electrical outlet mountable essentially flush with the wall surface for receiving at least one electrical male plug having an electrical cord extending therefrom, which male plug is to be plugged into an electrical socket mountable in said electrical outlet, said outlet comprising in combination:
  (a) a housing;
  (b) means for securing said housing interior of the wall surface;
  (c) a bracket for defining an opening to said housing, said bracket including gasket means for sealing the junction between said bracket and the wall;
  (d) said housing including a base and pedestal means extending from said base toward the opening for supporting said bracket and the electrical outlet within said housing;
  (e) means for interconnecting said housing with said bracket to mount the electrical socket and to locate the electrical socket a sufficient distance from the opening to accommodate the plugged in male plug between the electrical socket and the opening;
  (f) means for covering the opening to enclose the plugged in male plug, said covering means being essentially flush with the adjacent wall surface; and
  (g) means for accommodating passage of the electrical cord extending from the plugged in male plug to a remote location.

16. The outlet as set forth in claim 15 wherein said interconnecting means interconnects with said pedestal means.

17. The outlet as set forth in claim 16 wherein said pedestal means comprises a pair of pedestals disposed on opposed sides of said housing.

* * * * *